United States Patent

[11] 3,560,735

[72] Inventors John P. Strange
 Murrysville;
 Ray S. Freilino; Earl M. Becker,
 Pittsburgh, Pa.
[21] Appl. No. 766,194
[22] Filed Oct. 9, 1968
[45] Patented Feb. 2, 1971
[73] Assignee Mine Safety Appliances Company
 Pittsburgh, Pa.
 a corporation of Pennsylvania

[54] FLOW RESPONSIVE DETECTOR FOR INFRARED GAS ANALYZERS
 6 Claims, 3 Drawing Figs.
[52] U.S. Cl. .................................................. 250/43.5
[51] Int. Cl. .............................................. G01n 21/26,
 G01n 21/34
[50] Field of Search ........................................ 250/43.5

[56] References Cited
UNITED STATES PATENTS
2,555,327 6/1951 Elliott ............................ 250/43.5

FOREIGN PATENTS
786,516 11/1957 Great Britain ............... 250/43.5

*Primary Examiner*—William F. Lindquist
*Attorney*—Brown, Critchlow, Flick & Peckham ABSTRACT: A flow responsive detector for use in an infrared gas analyzer includes a pair of gas chambers, at least one of which is adapted to be irradiated by a pulsed beam of infrared energy to produce alternate heating and cooling, and concomitant expansion and contraction, of the gas therein when that gas contains a radiation absorbing component. A sensor responsive to gas flow in the form of a thermistor that has a negative temperature coefficient of resistance and a rate of change of resistance that varies inversely with temperature is mounted in a flow chamber, which is connected by a separate passage with each gas chamber. Where these passages enter the flow chamber, they are provided with jet orifices for directing a high velocity stream or jet flow of gas on the sensor in response to the expansion and contraction of gas in at least one of the gas chambers, thereby greatly enhancing the favorable nonlinear response characteristics of the sensor.

INVENTORS.
JOHN P. STRANGE
RAY S. FREILINO
EARL M. BECKER

BY Brown, Critchlow, Flick & Peckham
ATTORNEYS.

FLOW RESPONSIVE DETECTOR FOR INFRARED GAS ANALYZERS

This invention relates to a flow responsive detector unit for use in infrared gas analyzers of the general type in which the gas component of interest is selectively detected and measured by its absorption of a pulsed beam of infrared energy. It is a primary object of the invention to provide a detector unit of the foregoing type that incorporates a thermistor as a flow sensitive element and that includes means for enhancing the favorable nonlinear response characteristics of a thermistor to increase the sensitivity of the instrument.

Other objects of the invention will be apparent from the following description of a preferred embodiment in connection with the attached drawings, in which.

Figure 1:
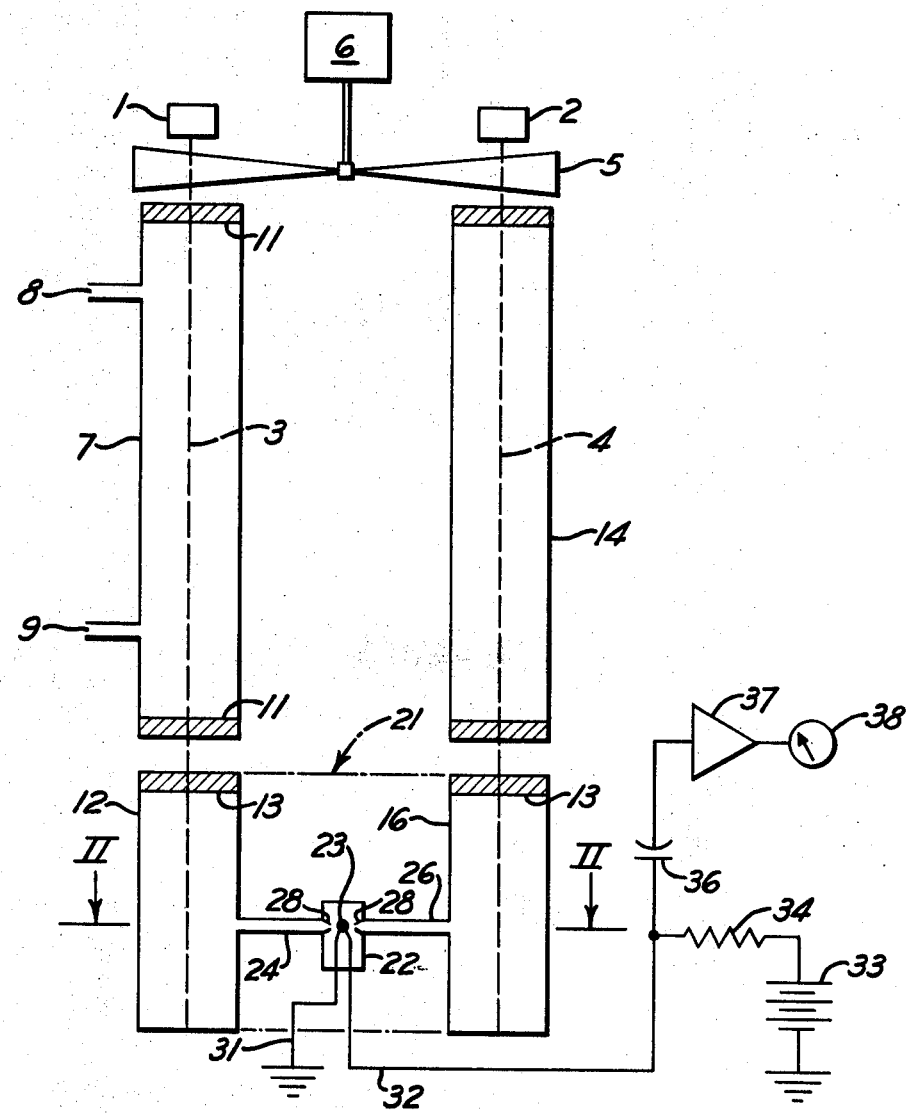
FIG. 1 represents a diagrammatic view of a nondispersive infrared gas analyzer in which two pulsed beams of infrared energy irradiate a body of gas.

The present invention is concerned with providing means to enhance certain physical characteristics of a thermistor to increase its sensitivity as a sensor responsive to the cooling effect of gas flow. A thermistor is a thermally sensitive electrically resistive element with a negative temperature coefficient of resistance, i.e., its resistance increases with a decrease in its temperature. Further, the rate of change of resistance varies inversely with the temperature, i.e., the resistance increases at a faster rate for each change of unit temperature as the temperature decreases. These characteristics give to the thermistor a nonlinear response to gas flow that is highly favorable to the use of such an element as a sensor responsive to a decrease in temperature. If the thermistor is heated by an applied external voltage to a temperature above the ambient temperature and if a gas of lower temperature is flowed over the thermistor surface, the cooling effect of the gas will produce an increased electrical resistance in the thermistor and the rate of change of that resistance will in turn increase the lower the temperature to which the thermistor is cooled. The invention is also predicated on the discovery that if the velocity of the gas flowing over the surface of the thermistor is increased, there results a disproportionate increase in output signal or sensitivity, merely because of the change in gas velocity. In other words, if the gas velocity is doubled the increase in response is more than doubled.

In accordance with the present invention, the flow-responsive detector unit is provided with a pair of gas chambers at least one of which is adapted to be irradiated by a pulsed beam of infrared energy and to contain a gas absorbing such energy. A gas flow chamber is connected to each of the gas chambers by a separate passage that terminates at the flow chamber in a jet orifice. These orifices provide high velocity jet flow in the flow chamber in response to the alternate expansion and contraction of the gas in at least one of the gas chambers when subjected to pulsed radiation. In other words, the gas that is irradiated and contains a radiation-absorbing component will alternately increase and decrease in temperature, thereby causing the gas to expand and contract and to flow from one gas flow and has a negative temperature coefficient of resistance over a portion of its temperature range and a rate of change of resistance that varies inversely with temperature is mounted in the flow chamber in the path of the jet flow from the orifices. The response of the sensor can be used to create a fluctuating signal in a conventional electrical measuring circuit.

Although the invention is described herein in connection with a specific type of nondispersive selective infrared gas analyzer, it should be understood that the invention is equally applicable to other types of infrared gas analyzers in which the gas component of interest is selectively detected and measured by the absorption of a pulsed beam of infrared energy, whether the analyzer is of the double or single beam type and whether, in the case of the double beam type, the beams are pulsed simultaneously or alternately. The invention is also applicable to dispersive as well as nondispersive analyzers.

Referring to FIG. 1, the analyzer includes a source of infrared radiation, shown here as two substantially identical, side-by-side sources 1 and 2, although it is obvious that they could be combined into a single source and then split, for transmitting radiation along two parallel beam paths. One of those beams, herein called the analytical beam, is composed of rays from source 1 extending parallel to the optical axis 3 (shown in broken lines). The other beam, herein called the reference beam, consists of rays from source 2 and extends parallel to the axis 4. The analytical beam passes from source 1 through a chopper region, where the rays are periodically interrupted by a shutter device 5 rotated by an electric motor 6. The beam then goes through a sample or analytical cell 7, which is provided with a gas inlet 8 and a gas outlet 9 and is otherwise sealed from the atmosphere by infrared-transparent windows 11 at each end. Finally, the analytical beam enters an analytical gas absorption chamber 12 through a window 13 similar to windows 11.

The reference beam follows a path parallel to the analytical beam, passing from source 2 through the chopper region traversed by shutter 5, then through a reference cell 14 similar to the sample cell 7, except that the reference cell contains a fixed volume of reference gas, which is preferably of the same composition as the sample gas but without the particular component that is to be detected and measured. After leaving the reference cell, the reference beam enters a reference gas absorption chamber 16, which is identical with the analytical gas chamber 12 previously described.

The gas chambers 12 and 16 are part of a detector unit 21. Generally, that unit includes a flow chamber 22; a thermistor 23 mounted in the flow chamber; flow passages 24 and 26 connecting gas chambers 12 and 16, respectively, to the flow chamber; and jet orifices 28 forming the terminal portions of the passages 24 and 26. In the form of analyzer illustrated in FIG. 1, the detector unit and its constituent chambers and passages may be entirely filled with a mixture of *a* the gaseous component to be detected, or some other gas or gaseous mixture having similar infrared absorption characteristics, and *b* a nonabsorbing diluent gas.

Referring generally to the operation of the analyzer illustrated in FIG. 1, equivalent beams of infrared energy are transmitted along the analytical and reference paths through the sample and reference cells to the gas chambers of the detector unit. These beams are simultaneously and periodically interrupted by the rotary chopper 5, so that pulses of infrared energy at the chopping frequency pass along the two beam paths. If the pulses reaching the detector unit contain energy in those wave lengths that are absorbed by the gas in that unit, the gas therein will be heated and tend to expand in accordance with the gas laws. If both gas chambers 12 and 16 receive and absorb the same amount of energy, the gas expansion in each of those chambers will be equal and there will be an increase in pressure therein and in passages 24 and 26 and in flow chamber 22, but there will be no gas flow through the flow chamber. This condition will prevail, for example, when the sample cell 7 contains a sample gas that includes none of the component to be detected and the reference cell 14 contains a similar gas.

In contrast, when the sample gas in cell 7 includes a given concentration of the component to be detected (that component being absent from the gas in the reference cell), some of the radiant energy in the analytical beam corresponding to the wave lengths absorbed by the component will be absorbed as the beam passes through the sample cell, but similar absorption will not occur in the reference cell. As a result, the pulses of infrared radiation reaching the analytical gas chamber 12 in the detector unit will have smaller energy in the wave lengths of interest than will the pulses of radiation reaching the reference has chamber 16. Accordingly, less infrared energy will be absorbed and transferred into heat in chamber 12 than in chamber 16, and the gas in the latter will expand more than that in the former to create a flow of gas from chamber 16 to chamber 12 through the connecting passages and the flow chamber 22. This gas flow will cool the thermistor, and the cooling effect can be measured as a change in resistance. Because of the pulsating nature of the gas expansion in the gas chambers of the detector unit, which follows the frequency of the beam chopper, the resulting temperature change in the thermistor 23 is also of a pulsating character. By making the thermistor a component of an electrical circuit such as that shown in FIG. 1, an alternating electrical signal is generated and can be measured. In its simplest form, the thermistor can be made one arm of a bridge and the varying resistance of that element detected by means of a meter across the bridge in the usual manner. It is more convenient, however, to measure the electrical output of thermistor 23 by impressing it on the input circuit of an AC amplifier, which, for best results is tuned to the frequency of the detector signal. It is this latter circuit that is shown diagrammatically in FIG. 1; it includes the wire leads 31 and 32 from the thermistor, a source of direct current 33, a resistor 34, a capacitor 36, an amplifier 37, and a meter 38.

Figure 2:
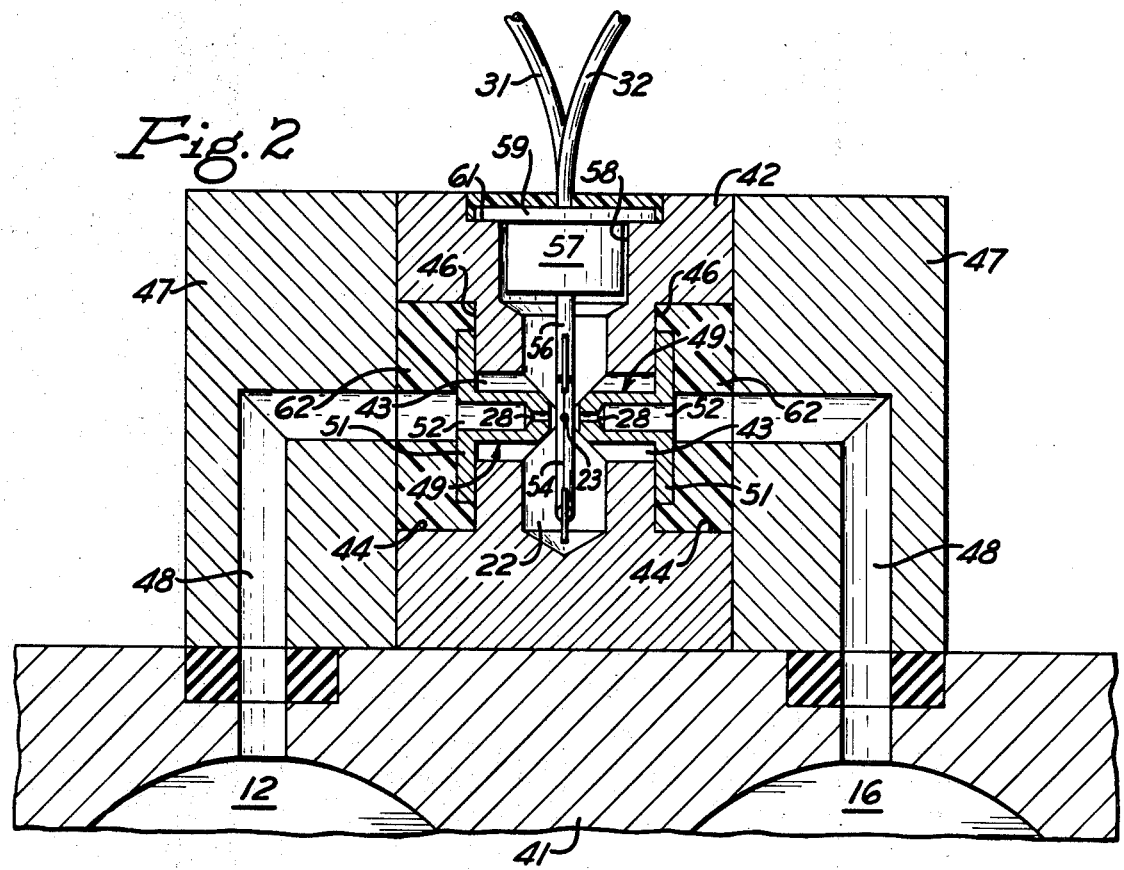
FIG. 2 is an enlarged fragmentary cross section, along the line II—II of FIG. 1 of the detector unit of this invention.
Figure 3:
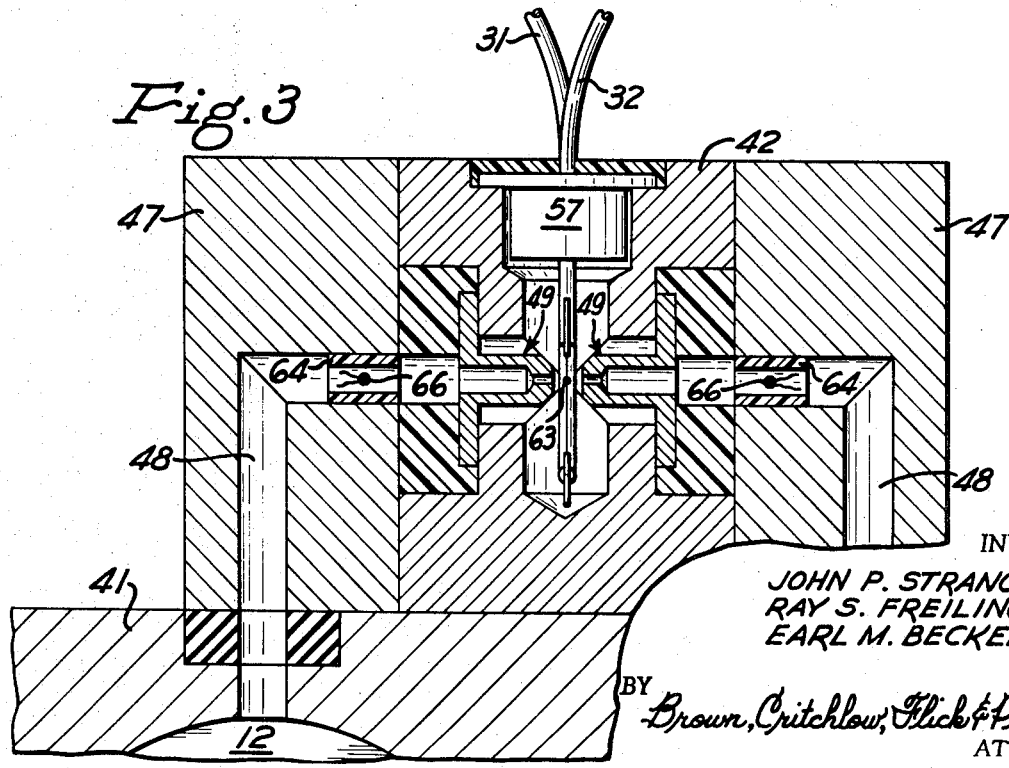
FIG. 3 is a similar cross section of a modified form of the detector unit.

The detector unit, to which the present invention is restricted, is shown in more detail in FIGS. 2 and 3. The unit includes a main metal block 41, provided with two cylindrical cavities that from the analytical and reference gas chambers 12 and 16. The main block also serves as a heat sink. A center block 42 is fastened to the main block by screws (not shown) and has a central well that forms the flow chamber 22. The center block also has two opposed lateral openings 43, the outer ends of which are counterbored at 44 to form bottom faces or shoulders 46. These faces are parallel to each other and to the longitudinal axis of the flow chamber, and substantially equidistant from that axis. Side blocks 47 are located on either side of the center block and detachably fastened to it and to the main block. The side blocks are provided with L-shaped flow passages 48 communicating with the counterbores of the center block and with the gas chambers 12 and 16. Extending into the holes 43 of the center block, and of smaller diameter than the holes, are tubular orifice members 49, the inner ends of which are provided with circular flanges 51 of smaller external diameter than the counterbores 44. The outer or bearing faces of these flanges are adapted to slidably engage the shoulders or bottom faces 46 of the counterbores for accurately positioning the orifice members in the openings 43. Each orifice member 49 has a tubular passage terminating at its outer end in the small orifice 28 that extends into the flow chamber 22. Taken together, the passages 48 in the side blocks, and the tubular passages 52 and orifices 28 in the orifice elements, constitute the flow passages 24 and 26 of FIG. 1, which are adapted to direct a jet stream of gas of relatively high velocity into the flow chamber when gas flows back and forth from one of the gas chambers 12 or 16 to the other.

The thermistor bead 23 is supported in a well that forms the flow chamber 22 in the center block. The thermistor bead has a generally ellipsoidal shape, with a major diameter of about 0.008 inches and a minor diameter of about 0.005 inches. It is supported at the ends of its major axis by fine wires 54 connected to heavier rigid wires 56, preferably in the same plane, passing through an insulated sealing block 57 disposed in counterbore 58 and held therein by a flange 59 in a counterbore 61 at the tip of the well. The suspended bead is located approximately in the middle of the flow chamber and substantially equidistant from the two orifices. Preferably, the orifices are arranged so that their axes coincide and pass through the axes of the thermistor bead. Such preferred positioning of the critical parts requires precise and delicate assembly, which is facilitated by the construction shown in FIG. 2. The location of the thermistor bead in a central plane normal to the axes of the jet orifices may be assured by using a simple jig inserted into one of the openings 43 before the orifice member is placed therein. The jig (not shown) may be a tubular member that fits snugly in the opening and has a central flange that abuts the counterbore face 46. The length of that portion of the jig between the flange and its outer end corresponds to the distance from the shoulder 46 to the center of the flow chamber. A wire with a hook on the free end can be passed through an opening in the jig, and a thermistor support hooded with the end of the wire and drawn toward the end of the jig until the support wires 56 rest against that end. If the end of jig is square (i.e., normal to its axis), the wires and thermistor will be in a plane parallel to the faces 43 of the counterbores. The sealing block is then cemented in place with suitable adhesive around the flange 59. When the adhesive has cured, the thermistor will be properly positioned in the flow chamber.

After the thermistor bead has been properly located, the orifice members 49 are then inserted, preferably one at a time, in the counterbores 44, with their flanges engaging the counterbore faces 46. Each orifice member is slidably moved until the axis of its orifice is centered on the thermistor bead. Such centering can best be done with the aid of a low power microscope oriented so that the bead is seen through the orifice of the member being positioned. When the orifice members have been positioned, they are locked in place by means of deformable plastic inserts 62, which can be made from a material, such as Teflon, that cold flows under pressure. In FIG. 2, the inserts are shown after they have been compressed on top of and around the flanges of the orifice members. Before compression, they are flat-ended cylinders, which fit snugly in the counterbores and temporarily hold the orifice members in place by friction. They are thick enough to protrude out of the counterbore and to be compressed flush therewith when the side blocks are assembled to the center block by means of screws (not shown). The resulting compression of the inserts causes them to cold flow around the flanges of the orifice members and to lock them in position.

The preferred approximate size of the thermistor bead 23 has already been mentioned. Other pertinent dimensions and relationships that have been found satisfactory, although not critical, are as follows. The jet orifices may have a diameter of around 0.010 or 0.015 inches. The space between the jet orifice and the thermistor is preferably about 0.015 inches, although this can be varied somewhat without great difference in response. In addition, it is desirable that the volume of the gas flow passages 24 and 26 be small relative to the volumes of the gas chambers 12 and 16 and the volume of flow chamber 22.

Because the thermistor 23 is normally heated by the passage of current through it, its temperature is somewhat above that of its environment. Under steady state conditions, it loses heat to the surrounding gas and to the walls of the chamber in which it is located. Normally, the layer of gas immediately adjacent the thermistor will be heated to a temperature almost equal to that of the thermistor itself. It is a feature of the present invention that, by causing jet flow of gas in flow chamber 22, intimate contact between the cooler flowing gas and the thermistor is increased by dispersing the heated layer of gas normally surrounding the thermistor to produce maximum cooling of the thermistor itself. In addition, the gas flowing in the relatively large passage upstream of the orifice, when caused to pass through the orifice undergoes an increase in velocity. The resulting jet effect enhances the entrainment of other cool gas in the flow chamber, which in turn adds to the cooling effect on the thermistor. A further advantage is obtained by reason of the negative coefficient of resistance and the nonlinear response characteristic of the thermistor. If a constant voltage is applied to the thermistor and if the electrical resistance of the thermistor increases, as it does, nonlinearly with decreasing temperature, cooling the thermistor will decrease the electrical current through it, which will in turn reduce the electrical power dissipated as heat, rendering the instrument more sensitive. By reason of the enhanced cooling resulting from the jet flow of gas on the thermistor, a greater than expected sensitivity is obtained because of the contributing effect of the self-reduction of electrically generated heat in the thermistor element. The greater the cooling effect, the more advantage can be taken of the nonlinear response of the thermistor.

The cooling effect of the gas passing over the thermistor can be further enhanced by artificially reducing the temperature of the gas just before it reaches the thermistor. One way of providing such additional cooling is shown in FIG. 3. Thermal insulating linings or sleeves 64 are inserted in the side blocks and the gas passing therethrough is exposed to thermoelectric elements 66 in the form of a thermoelectric junction through which current is passed in a direction to cause absorption of heat by the well-known Peltier effect. Alternatively, the tubular portions of the orifice members 49 could be of insulating material, and the thermoelectric cooling elements located there. Other methods of cooling the small volume of gas in the passages adjacent the flow chamber include jacketing those passages and bathing the jackets with a cooling fluid that could be pumped through the jackets.

We claim:

1. A flow-responsive detector unit for use in an infrared gas analyzer of the type in which the gas component of interest is selectively detected and measured by its absorption of a pulsed beam of infrared energy, said detector unit comprising: a pair of gas chambers at least one of which is adapted to be irradiated by a pulsed beam of infrared energy and to contain a gas absorbing such energy in the same spectral region as the component of interest, a gas flow chamber, and electrically heated resistance sensor responsive to gas flow and having a rate of change of resistance that increases as its temperature decreases mounted in the flow chamber, a separate passage connecting each gas chamber to the flow chamber, each passage terminating at the flow chamber in an orifice member having a jet orifice to provide relatively high velocity jet flow across the surface of the sensor to enhance the cooling effect of such gas flow by the entrainment of cool gas in the flow chamber as gas flows from one gas chamber to the other in response to the alternate expansion and contraction of the gas in at least one of the gas chamber when subjected to said pulsed infrared energy, the jet orifices being substantially axially aligned with each other with the sensor mounted substantially midway between the orifices and adjacent their axes, means for initially adjusting each orifice member in a separate defined plane normal to the axes of the orifices for initially locating the orifices in axial alignment with the sensor and with each other, and means for maintaining the orifices in such alignment.

2. Apparatus according to claim 1, in which the sensor is a thermistor bead supported in a well in a block, the block being provided with opposed openings in its wall for loosely receiving the orifice members and being provided with counterbores in the outer ends of those openings remote from the well terminating in flat bottom faces parallel to each other, and in which the means for initially adjusting each orifice member includes a flange on each of said members of smaller diameter than the counterbore and having a bearing surface normal to the axis of the orifice for slidably engaging the bottom face of the counterbore.

3. Apparatus according to claim 2, in which said means for maintaining the orifices in alignment include a deformable insert disposed in each counterbore and of substantially the same diameter as the counterbore, each insert overlying the flange of an orifice member and adapted to deform under clamping pressure to flow between the edge of the flange and the wall of the counterbore to lock the orifice member in a given position, and means for subjecting the inserts to clamping pressure.

4. Apparatus according to claim 1, in which the sensor is a thermistor bead that has a substantially ellipsoidal shape, and in which the axes of the bead and the axes of the orifices are coincident.

5. Apparatus according to claim 1, that also includes means for cooling the gas in said passages before such gas enters the flow chamber.

6. Apparatus according to claim 5, in which the cooling means include thermoelectric elements in said passages, and means for thermally insulating those passages adjacent the thermoelectric elements.